(No Model.)

J. G. McCOY.
ANIMAL TRAP.

No. 583,924. Patented June 8, 1897.

WITNESSES:
Edwin L. Bradford
K. A. Nau

INVENTOR,
James G. McCoy,
BY John Wedderburn,
ATTORNEY.

UNITED STATES PATENT OFFICE.

JAMES G. McCOY, OF SUISUN CITY, CALIFORNIA.

ANIMAL-TRAP.

SPECIFICATION forming part of Letters Patent No. 583,924, dated June 8, 1897.

Application filed June 29, 1896. Serial No. 597,415. (No model.)

*To all whom it may concern:*

Be it known that I, JAMES G. MCCOY, a citizen of the United States, residing at Suisun City, in the county of Solano and State of California, have invented certain new and useful Improvements in Animal-Traps; and I do hereby declare the following to be a full, clear, and exact description of the invention, such as will enable others skilled in the art to which it appertains to make and use the same.

My invention relates to animal-traps.

My object is to provide an improved simple animal-trap which can be set close at any desired weight, so that it will remain open until the requisite number of animals have passed therein or until the animal sought to be entrapped has entered.

A further object is to provide an improved and simple bait-holder which will prevent the animal or animals from eating the bait too rapidly, so that bait will be provided to entice a number of animals into the trap before it is sprung.

Figure 1:
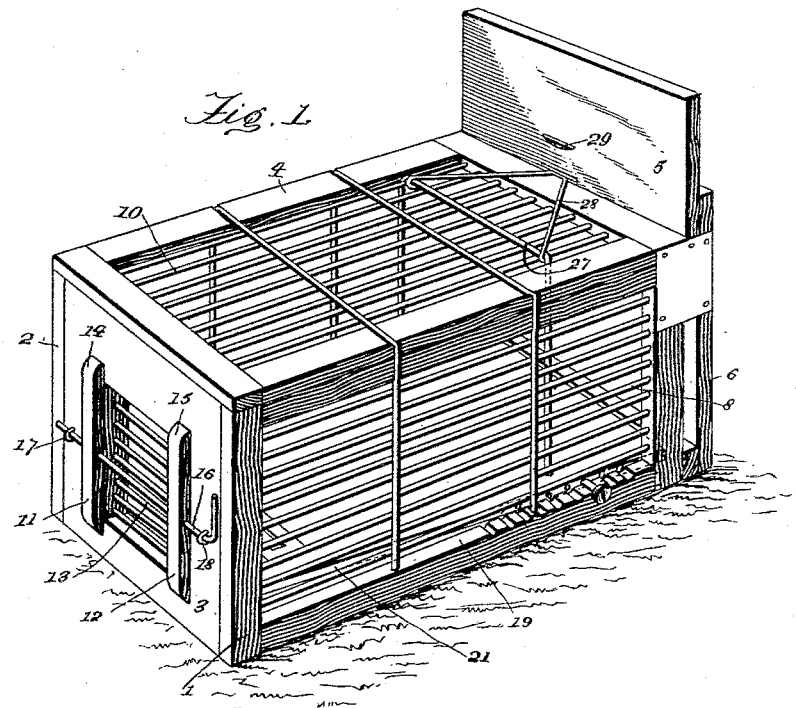
Figure 2:
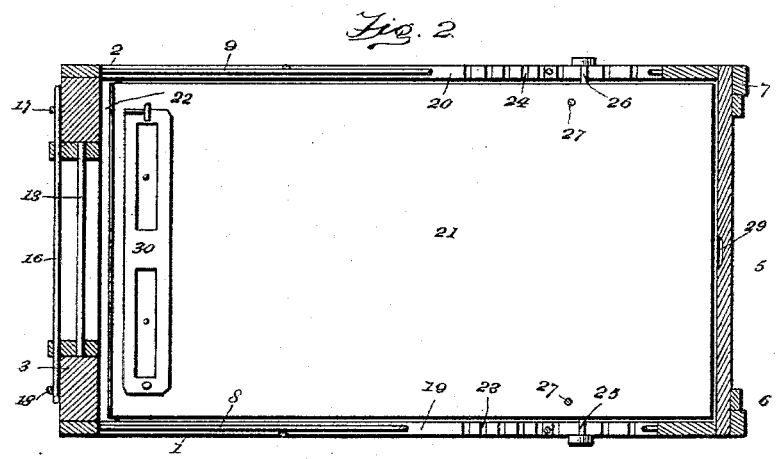
Figure 3:
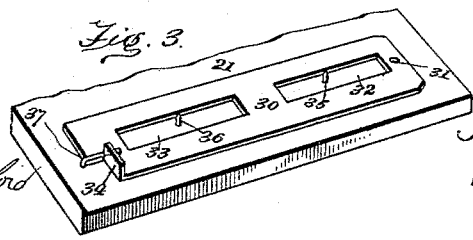

In the accompanying drawings, Figure 1 is a perspective view looking toward the rear of the trap, which is set; Fig. 2, a sectional plan view, and Fig. 3 a detail of the bait-holder.

The respective sides of the trap are designated by numerals 1 and 2, while 3 is the rear end, 4 the top, and 5 the door or gate, which is slidable vertically in respective guides 6 and 7. The open portions of the sides are crossed by respective sets of rods or bars 8 and 9, while the top is similarly constructed, as shown at 10. A removable gate or door is fitted into the rear end of the trap, and this gate or door consists of side pieces 11 and 12 and bars 13, the said side pieces being provided with sets of ears 14 and 15, respectively, which abut upon the end of the trap when the gate is in position. A locking-rod 16, passing through staples 17 and 18, projecting from the rear end, and through the side piece of the gate, is adapted for removal when the gate is to be taken out, as when the trap is being baited.

The lower portions of the sides of the trap are provided with respective racks 19 and 20. The numeral 21 designates my improved tripping platform, which is entirely disconnected from the trap and has its rear end resting on a cross-bar 22. The side edges of this platform are provided with respective sets of screw-holes 23 and 24, which are in alinement with the indented portions of the rack. There are two pivot-screws 25 and 26, whose inner ends are screwed into opposite screw-holes in the edges of the platform and whose shanks are journaled in the indentations of the rack which are in alinement with said screw-holes. By removing the screws and inserting them in other screw-holes the leverage of that portion of the platform lying to the rear of said screws may be increased or diminished, so that the rear portion of the platform may be arranged to tilt downward at any desired weight and spring the trap. This construction possesses many advantages, inasmuch as the trap can be set to be sprung when an animal or animals of given weight enter and pass to the rear of the trap, where the bait is located, as will appear later on. A U-shaped vertical frame 27 has the ends of its legs connected to the platform and extends up through the top of the trap. A substantially V-shaped tripping-frame 28 has the ends of its arms connected to the cross-bar of the U-shaped frame, and its forward end is located close to the main door and adapted for engagement with notches 29, cut therein, so that said door may be held at any desired height when the trap is set.

My improved bait-holder consists of a strip 30, which is pivoted at 31 to the tilting platform, being provided with two elongated slots 32 and 33 and with a catch 34 at its free end. Two pins 35 and 36, respectively connected to the platform, project up through slots in the strip, as shown. The numeral 37 designates a locking-pin or catch, which is adapted to engage with the catch on the strip or plate.

When it is desired to bait the holder, the locking-pin is swung aside and the strip or plate turned on its pivot. The bait is pressed down over the two pointed pins just described, the strip then swung around so that it will lie on top of the bait, and the locking-pin thrown into engagement with the catch. When thus baited, only so much of the bait as is exposed through the slots in the strip can be obtained by the animals, so that it will last until a number have entered the trap. The small door at the rear of the trap is removed before the baiting operation, so that the bait can be quickly and easily applied to the bait-holder.

The operation is as follows: When the animal or animals first enter the trap, the latter is not sprung, but as they move toward the bait at the rear of the tilting platform the leverage begins to increase, until when they reach the bait it has become sufficient and the rear end of the platform is depressed, thereby pulling the tripping-frame out of engagement with the sliding door, whereupon the latter drops and the cage is closed.

Having thus described my invention, what I claim as new, and desire to secure by Letters Patent, is—

1. In an animal-trap, the combination with a tilting platform, and an adjustable pivot therefor, so that the leverage of the platform can be varied, of a trap-door, and mechanism connecting the platform with the gate, but which is thrown out of engagement with the latter when the platform is tilted.

2. In an animal-trap, the combination with racks, of a tilting platform, pivots adjustably connected to a platform and journaled in the racks, a gate or door, and tripping mechanism connecting the platform to the gate so that the latter is released and the trap closed when the platform is tilted.

3. In an animal-trap, the combination with rack-bars, of a tilting platform having a series of screw-holes in alinement with the indented portions of the rack, pivoted screws in the screw-holes and journaled in the racks, a trap door or gate, and tripping mechanism connecting the platform with the gate, so that when the latter is tilted the gate will close the trap.

4. In an animal-trap, a bait-holder comprising a bait-holding pin, a removable plate having an aperture through which the pin projects, and a device for holding the plate in position on top of the bait.

5. In an animal-trap, a bait-holder comprising a hinged plate provided with an opening, a bait-holding pin projecting through the opening, and catch mechanism for holding the plate in position on top of the bait.

6. In an animal-trap, a bait-holder comprising a pivoted plate provided with a slot and having a catch, a bait-holding pin projecting through the slot, and a second catch adapted to engage with the catch on the plate and hold the latter in position upon the bait.

7. In an animal-trap, the combination with a cage provided with an opening, of a removable door comprising side pieces which fit in the opening and have abutments which rest against the cage, bars connecting said side pieces, eyes projecting from the cage, and a locking-rod passing through the eyes and said pieces of the door.

In testimony whereof I have signed this specification in the presence of two subscribing witnesses.

JAMES G. McCOY.

Witnesses:
J. W. KERNS,
JAS. T. WELLS.